(No Model.)
J. ERICSON.
PAN LIFTER AND TURNER.
No. 446,114. Patented Feb. 10, 1891.
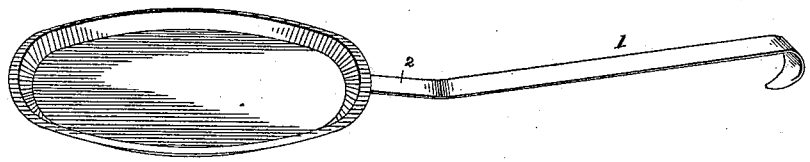
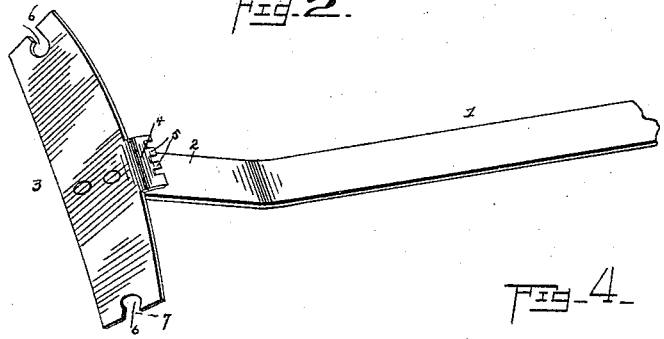
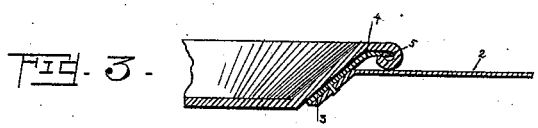
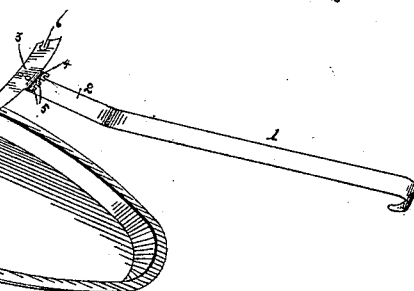
Witnesses
E. S. Duvall Jr.
H. F. Riley
Inventor
John Ericson,
By his Attorneys,
C. A. Snow & Co.

UNITED STATES PATENT OFFICE.

JOHN ERICSON, OF SABINE PASS, TEXAS.

PAN LIFTER AND TURNER.

SPECIFICATION forming part of Letters Patent No. 446,114, dated February 10, 1891.

Application filed August 13, 1890. Serial No. 361,857. (No model.)

*To all whom it may concern:*

Be it known that I, JOHN ERICSON, a citizen of the United States, residing at Sabine Pass, in the county of Jefferson and State of Texas, have invented a new and useful Pan Lifter and Turner, of which the following is a specification.

The invention relates to improvement in pan lifters and turners.

The object of the present invention is to provide a pan lifter and turner adapted to engage and fit a pan or similar article or vessel having the usual rim or bead at its edge and capable of engaging the pan and readily turning the same when the latter is upon the stove.

The invention consists in the construction and novel combination and arrangement of parts hereinafter fully described, illustrated in the accompanying drawings, and pointed out in the claims hereto appended.

In the drawings, Figure 1 is a perspective view showing the lifter in position for lifting a plate. Fig. 2 is a perspective view of the lifter. Fig. 3 is a similar view showing the lifter in position in turning the pan. Fig. 4 is a detail sectional view showing how the handle engages the bead of the pan.

Referring to the accompanying drawings, 1 designates a handle constructed of metal and having its lower end 2 bent at an angle, and having secured to it by rivets or the like a curved plate 3, adapted to fit against the side of a pan or plate or similar receptacle. The curved plate 3 is secured intermediate of its ends to the handle 1, and is provided at its upper edge with an integral flange or projection 4, extending upward from the plate and handle and provided at its upper edge with a series of teeth 5, and when the lifter is placed against the side of a pan or the like the curved plate conforms to the side and the projection or flange engages the crimped rim or bead at the edge of the plate or pan and the weight of the pan and its contents will force the toothed flange or projection under the rim or bead, enabling the lifter to obtain a secure hold without liability of the plate or pan accidentally slipping. The ends of the curved plate 3 are provided with curved notches or recesses 6, adapted to receive and engage the rim of a pan, as illustrated in Fig. 3 of the accompanying drawings, to enable the device to turn a pan on a stove or move it from one part of the stove to another.

It will be seen that the device is simple and inexpensive in construction, and is adapted to readily fit and engage a pan, pie-plate, or kindred receptacle and securely hold the same without liability of accidentally dropping and of turning a plate or pan on moving the same from one part of a stove to another.

What I claim is—

1. A plate-lifter comprising the handle, the curved plate 3, secured to one end of the handle and adapted to engage a plate or receptacle and provided with the flange projecting inward to engage the interior of the rim, substantially as described.

2. A plate-lifter comprising the handle, the curved plate 3, secured to one end of the handle and provided at its upper edge with the integral flange projecting inward and arranged to engage the interior of the rim of a vessel, substantially as described.

3. A plate-lifter comprising the handle and the plate 3, rigidly secured to the handle and having in its edge the curved recess 6, and the slot 7, forming a mouth to the recess 6 and adapted to engage the rim of a pan, substantially as described.

4. A plate-lifter comprising the handle, the curved plate 3, secured to the end of the handle and provided at its upper edge with the integral flange projecting inward to engage the rim of a vessel, and the curved recesses 6 at the ends of the plate, for the purpose set forth.

In testimony that I claim the foregoing as my own I have hereto affixed my signature in presence of two witnesses.

JOHN ERICSON.

Witnesses:
W. H. GILLILAND,
J. J. F. GILLILAND.